(12) United States Patent
Tsai et al.

(10) Patent No.: US 8,804,356 B2
(45) Date of Patent: Aug. 12, 2014

(54) MOUNTING APPARATUS FOR EXPANSION CARD

(75) Inventors: Lung-Sheng Tsai, New Taipei (TW); Yao-Chung Chen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 109 days.

(21) Appl. No.: 13/411,905

(22) Filed: Mar. 5, 2012

(65) Prior Publication Data

US 2012/0320547 A1   Dec. 20, 2012

(30) Foreign Application Priority Data

Jun. 14, 2011   (TW) .............................. 100120785 A (51) Int. Cl.
*H05K 1/14* (2006.01)

(52) U.S. Cl.
USPC ........... 361/759; 361/730; 361/731; 361/736; 361/737; 361/740; 361/741; 361/742; 361/801; 361/802; 361/803; 361/804; 361/809; 361/810; 439/61; 439/62; 439/63; 439/64

(58) Field of Classification Search
USPC .............. 439/61–64; 361/730–731, 736–737, 361/740–742, 759, 801–804, 809–810, 752, 361/726
See application file for complete search history.

(56) References Cited

U.S. PATENT DOCUMENTS

| 6,058,025 A * | 5/2000 | Ecker et al. ................... 361/816 |
| 7,499,289 B2 * | 3/2009 | Liang ............................ 361/796 |
| 2006/0007664 A1 * | 1/2006 | Jing .............................. 361/801 |

* cited by examiner

*Primary Examiner* — Jinhee Lee
*Assistant Examiner* — James Wu
(74) *Attorney, Agent, or Firm* — Novak Druce Connolly Bove + Quigg LLP (57) ABSTRACT

A mounting apparatus for an expansion card includes a bottom plate, a circuit board, and mounting bracket. The bottom plate defines mounting hole. The circuit board is secured to the bottom plate, and a gap is defined between the bottom plate and the circuit board. The mounting bracket includes a base secured to the bottom plate. The base includes two positioning pieces and an elastically deformable mounting portion. The two positioning pieces are received in the gap, to prevent the mounting bracket from moving along a first direction substantially perpendicular to the bottom plate, and the elastically deformable mounting portion is engaged in the mounting hole, to prevent the mounting bracket from moving along a second direction substantially parallel to the bottom plate.

19 Claims, 8 Drawing Sheets

MOUNTING APPARATUS FOR EXPANSION CARD

BACKGROUND

1. Technical Field

The present disclosure relates to mounting apparatuses, and more particularly to a mounting apparatus for securing an expansion card in an electronic device.

2. Description of Related Art

A computer system usually includes a plurality of expansion cards, such as sound cards, video cards, and graphics cards, for enhancing capabilities of the computer system. Generally, a first end of the expansion card is inserted into a securing slot of a circuit board, a second end of the expansion card adjacent to the first end is secured to a rear plate of the computer, and a third end of the expansion card opposite to the second end is secured to a mounting bracket secured to the circuit board. The expansion cards are often fixed in the mounting bracket with screws, and the mounting bracket is often secured to the circuit board with screws. However, fixing the expansion cards and mounting bracket with screws are very laborious and time-consuming. Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
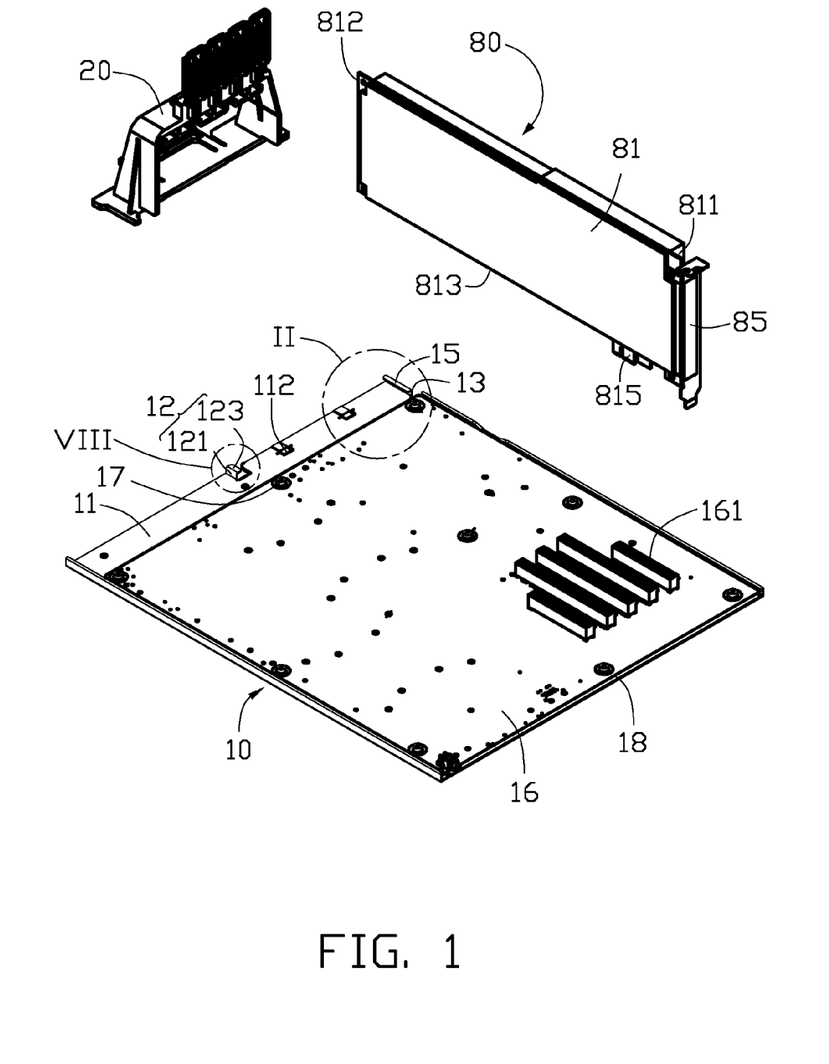
FIG. 1 is an exploded, isometric view of one embodiment of a mounting apparatus an expansion card.

Referring to FIG. 1, a mounting apparatus is configured for mounting an expansion card 80. The mounting apparatus in accordance with an embodiment includes a bottom plate 10 and a mounting bracket 20.

The expansion card 80 includes a body 81 and an installing piece 85. The body 81 includes a first end 811, a second end 812 opposite to the first end 811, and a third end 813 connected to the first end 811 and the second end 812. The first end 811 is secured to the installing piece 85. The third end 813 includes an inserting end 815.

Figure 2:
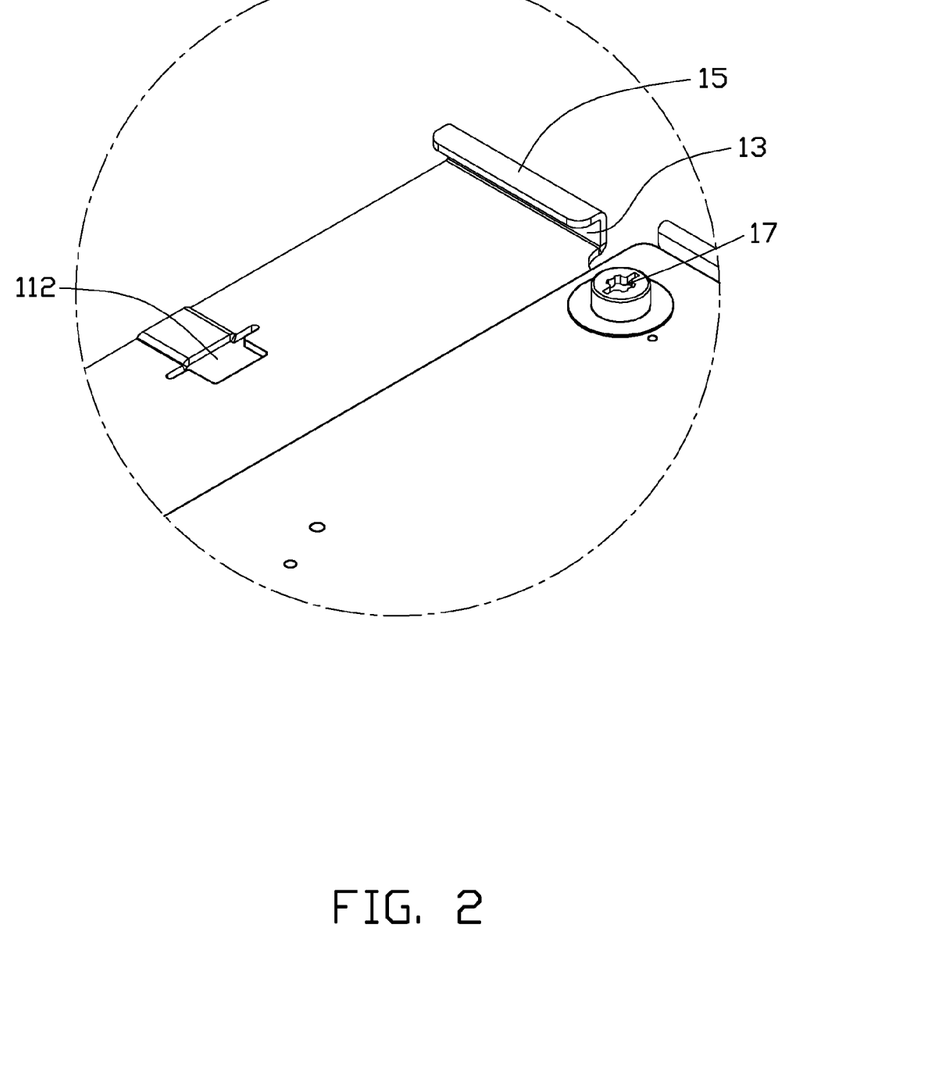
FIG. 2 is an enlarged view of a circled portion II of FIG. 1.

Referring to FIG. 2, the bottom plate 10 includes a body 11 and a flange 13 extending from a side edge of the body 11. The body 11 defines two mounting holes 112 adjacent to the flange 13. A limiting portion 12 extends from the body 11. The limiting portion 12 includes a first limiting piece 121 and a second limiting piece 123. The first limiting piece 121 extends from the body 11, and the second limiting piece 123 extends from the first limiting piece 121. The first limiting piece 121 is substantially parallel to the flange 13. The second limiting piece 123 is substantially perpendicular to the first limiting piece 121. A circuit board 16 is secured to the body 11 by a plurality of locking members 17. The circuit board 16 is substantially parallel to the body 11. A first gap 18 is defined between the circuit board 16 and the body 11. The circuit board 16 defines a securing slot 161. The inserting end 815 can be inserted into the securing slot 161. A limiting piece 15 extends from a top edge of the flange 13. In one embodiment, the limiting piece 15 is substantially perpendicular to the flange 13. The flange 13 is substantially perpendicular to the body 11.

Figure 3:
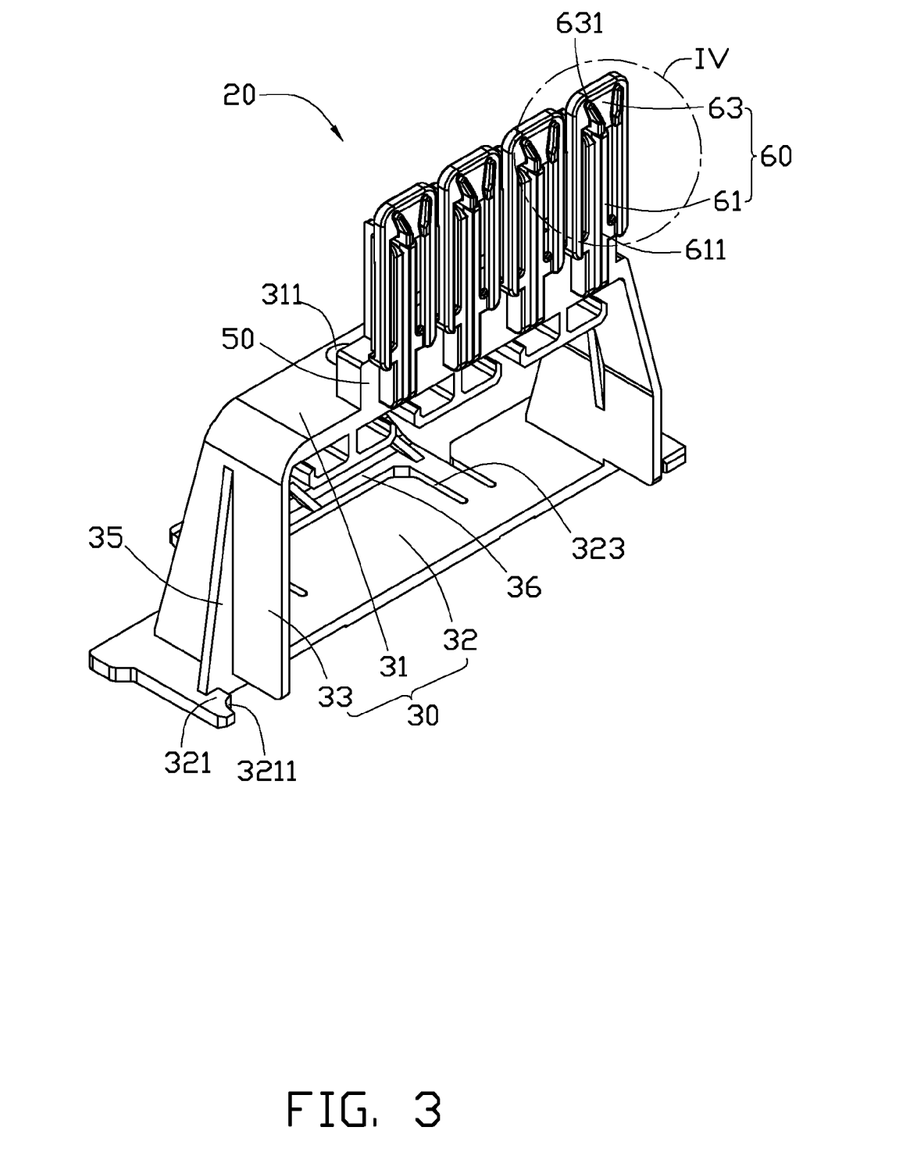
FIG. 3 is an isometric view of a mounting bracket of FIG. 1.
Figure 4:
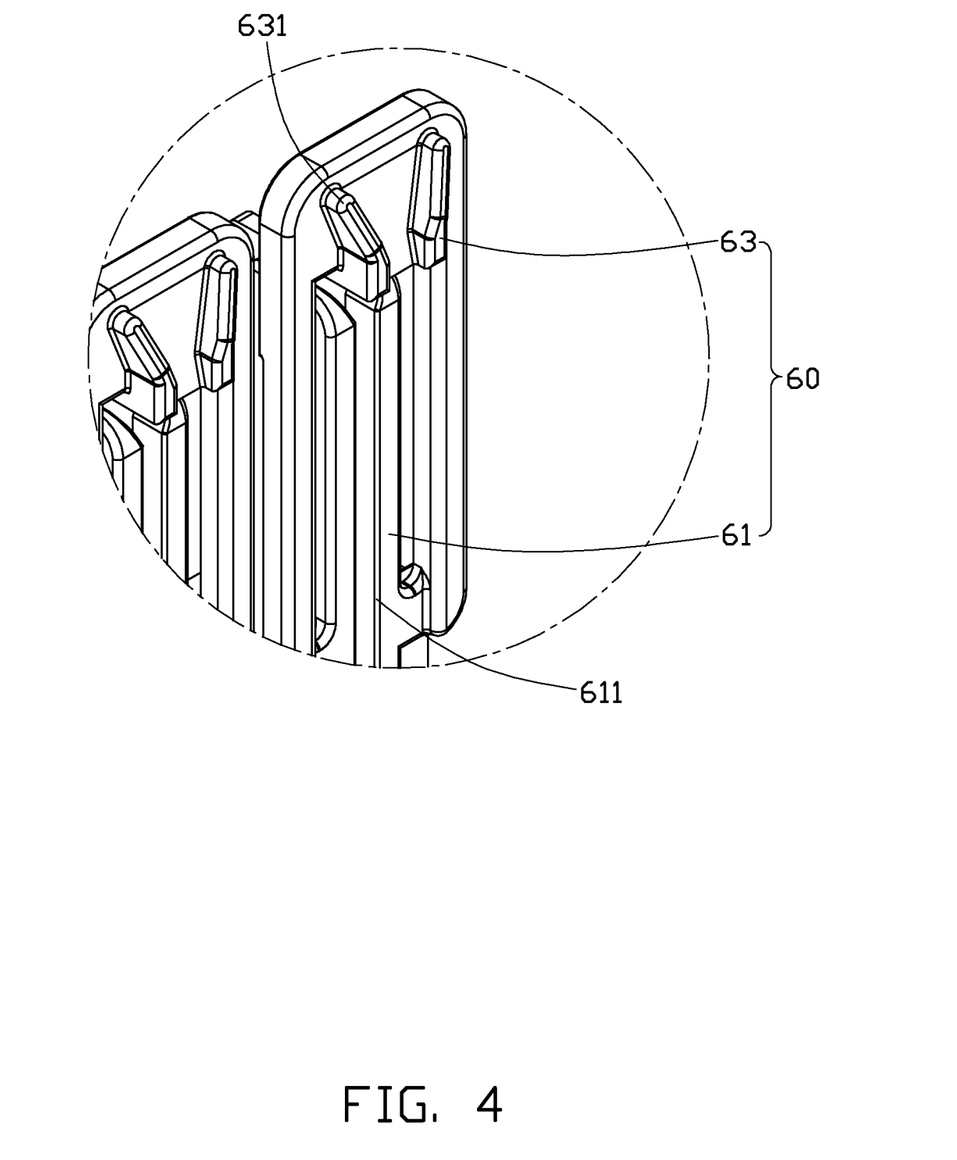
FIG. 4 is an enlarged view of a circled portion IV of FIG. 3.
Figure 5:
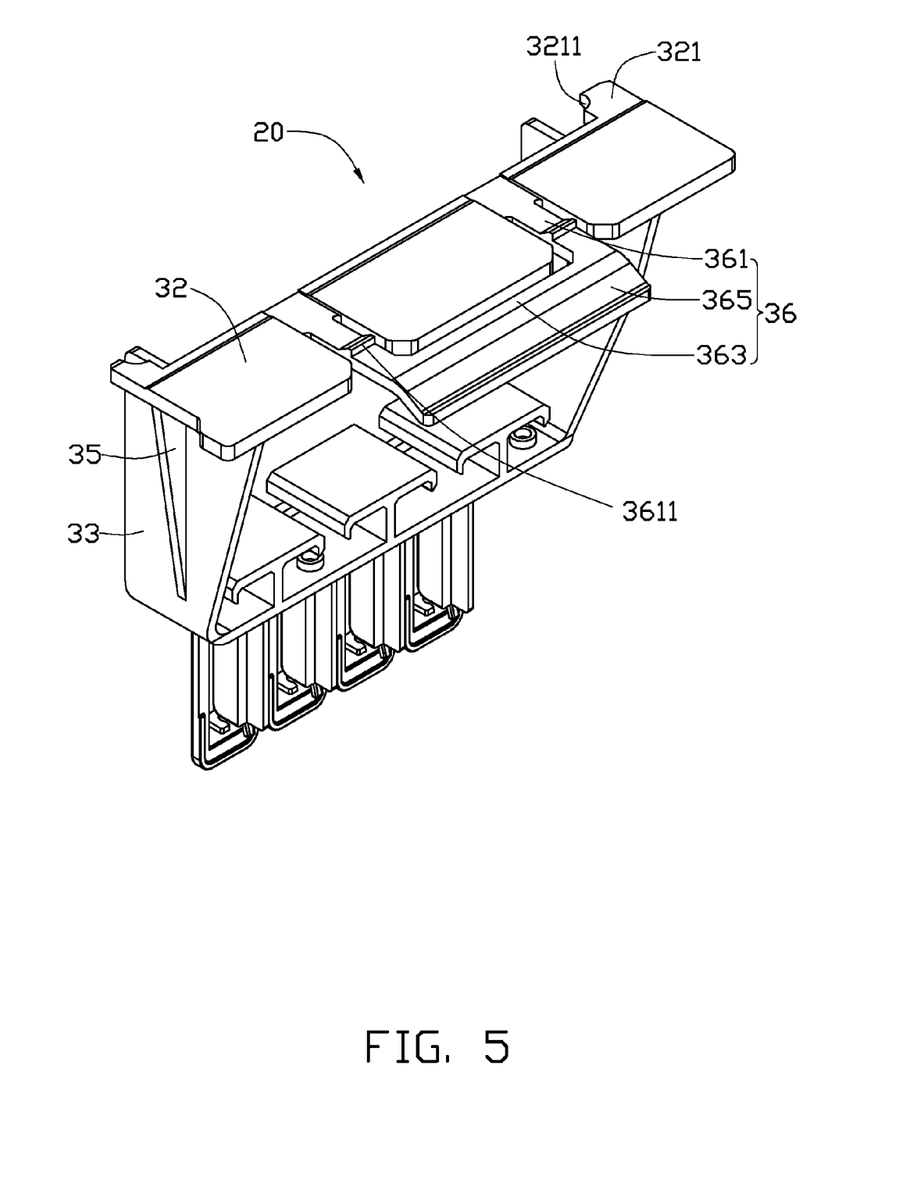
FIG. 5 is similar to FIG. 3, but viewed in a different aspect.

Referring to FIGS. 3-5, the mounting bracket 20 includes a base 30 and an inserting assembly 50.

The base 30 includes a top wall 31, a bottom wall 32, and a sidewall 33 obliquely extending from the bottom wall 32. The sidewall 33 is connected to the top wall 31. The top wall 31 defines two positioning holes 311. The sidewall 33 extends out of the bottom wall 32. A strengthening rib 35 extends from the bottom wall 32 and extends to the sidewall 33. The strengthening rib 35 is substantially perpendicular to the bottom wall 32 and the sidewall 33. A positioning piece 321 extends from the bottom wall 32. The positioning piece 321 defines a cutout 3211. A mounting portion 36 is located on the bottom wall 32. The mounting portion 36 is elastically deformable and includes two mounting plates 361, a connecting plate 363 connected to the two mounting plates 361, and an operating plate 365 extending from the connecting plate 363. A second gap 323 is defined between each of the two mounting plates 361 and the bottom wall 32. A latching block 3611 extends from a bottom edge of each of the two mounting plates 361. The latching block 3611 can be engaged in the mounting hole 112.

The inserting assembly 50 includes a plurality of inserting portions 60. Each inserting portion 60 includes two inserting plates 61 and a resilient piece 63 connected to the two inserting plates 61. An inserting slot 611 is defined between the two inserting plates 61. A second end 812 can be inserted into the inserting slot 611. Two limiting blocks 631 extend from the resilient piece 63.

Figure 6:
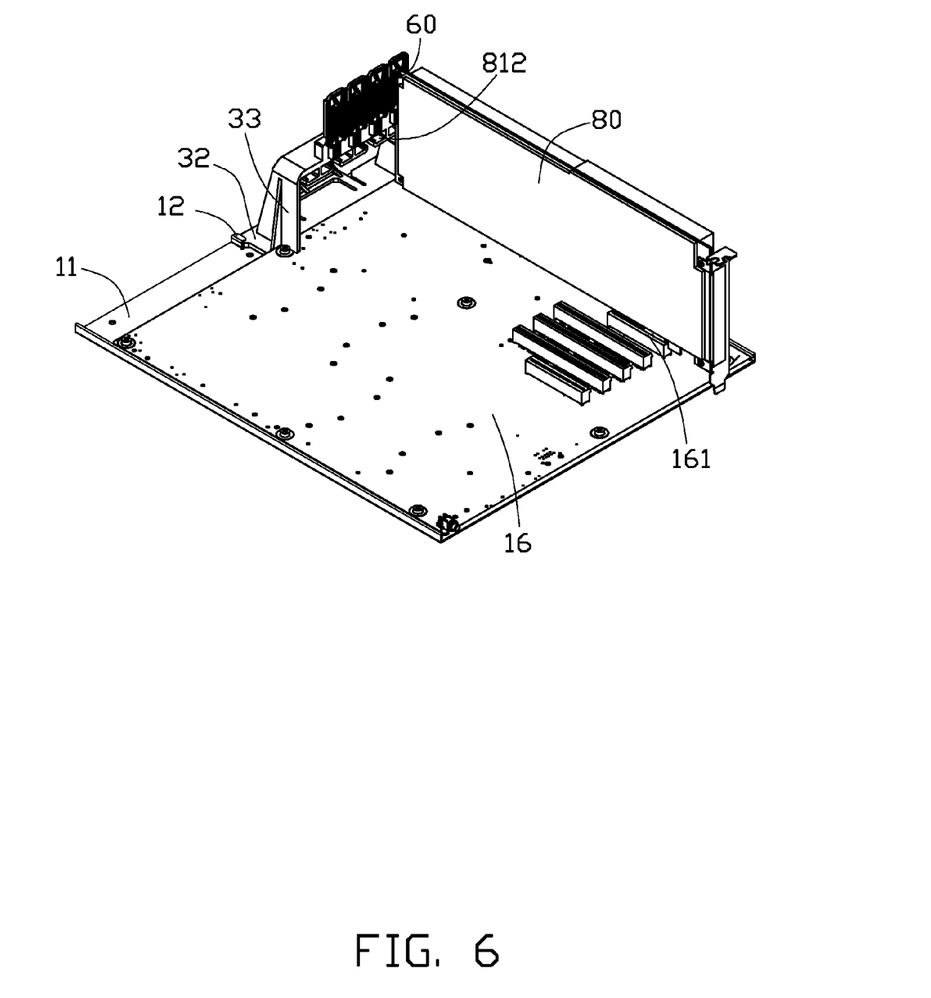
FIG. 6 is isometric view of assembly of the mounting apparatus and the expansion card of FIG. 1.
Figure 7:
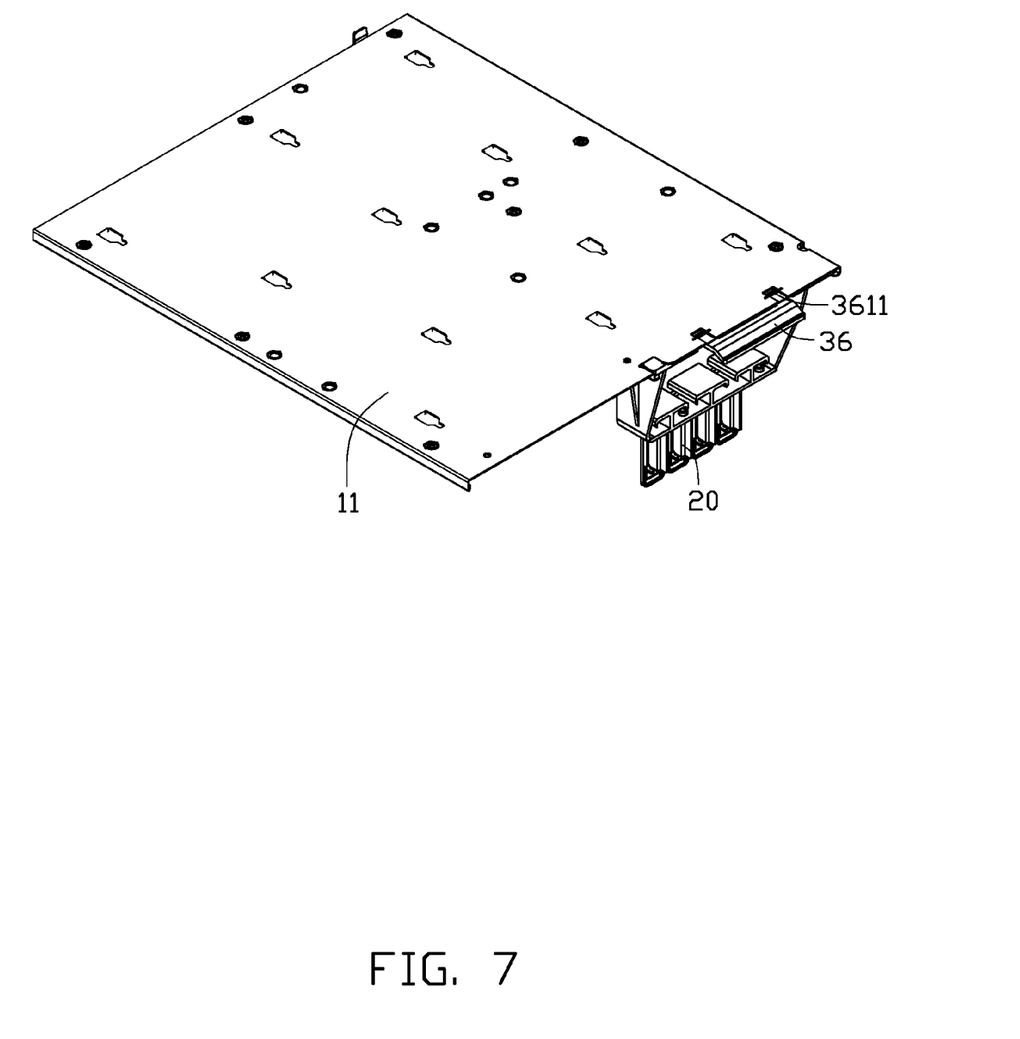
FIG. 7 is similar to FIG. 6, but viewed in a different aspect.
Figure 8:
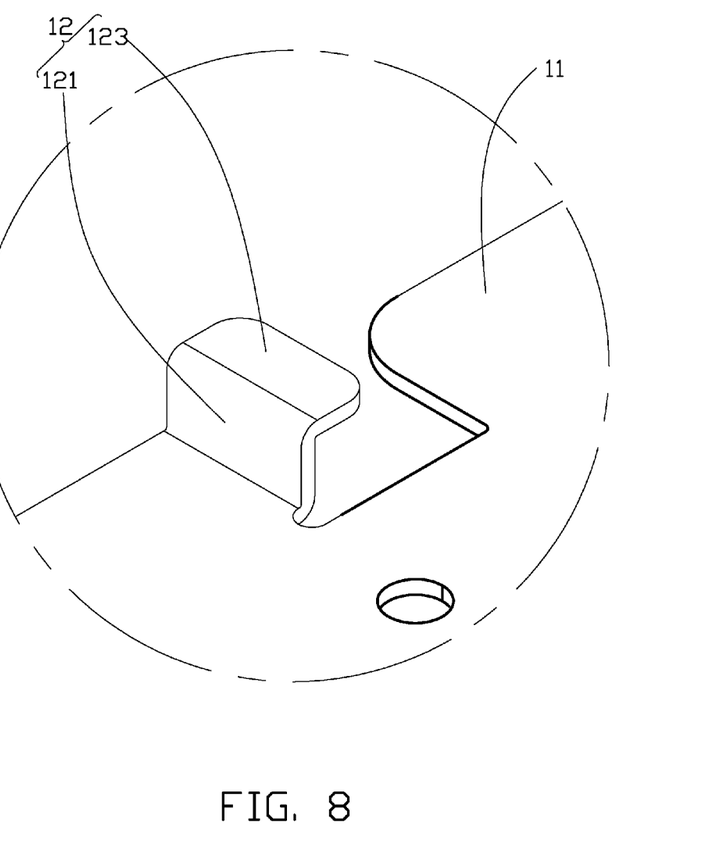
FIG. 8 is an enlarged view of a circled portion VIII of FIG. 1.

Referring to FIG. 6 and FIG. 7, in assembly of the mounting bracket 20, the mounting bracket 20 is moved towards the bottom plate 10, and the bottom wall 32 is placed between the limiting portion 12 and the flange 13. The mounting bracket 20 is slid towards the circuit board 16, until the latching block 3611 is blocked by the body 11. The mounting bracket 20 is further slid, the mounting portion 36 is elastically deformed until the latching block 3611 is aligned with the mounting hole 112. The positioning piece 321 is engaged in the first gap 18, to prevent the mounting bracket 20 from moving along a first direction substantially perpendicular to the body 11. The mounting portion 36 is configured to be engaged in the mounting hole 112, to prevent the mounting bracket 20 from moving along a second direction, which is substantially parallel to the body 11. The two locking members 17 are located between the two positioning pieces 321 and abut against edges of the cutout 3211. The sidewall 33 abuts against the circuit board 16. Thus, the mounting bracket 20 is secured to the bottom plate 10.

In assembly of the expansion card 80, the expansion card 80 is moved towards the bottom plate 10. The inserting end 815 is opposite to the securing slot 161, and the second end 812 is opposite to the inserting slot 611 between the two limiting blocks 631. The expansion card 80 is moved towards the circuit board 16, the second end 812 presses the resilient piece 63 to elastically deform the resilient piece 63. The second end 812 is slid into the inserting slot 611, and the inserting end 815 is aligned with the securing slot 161. Until the inserting end 815 is inserted into the securing slot 161, the second end 812 is slid over the resilient piece 63. The resilient piece 63 abuts a top edge of the expansion card 80, which is substantially parallel to the resilient piece 63. Thus, the second end 812 is secured to the mounting bracket 20. The installing piece 85 is secured to a rear plate of a computer (not shown), and the first end 811 is secured to the rear plate.

In disassembly, the resilient piece 63 is driven to be elastically deformed. The expansion card 80 is moved away from the bottom plate 10. The expansion card 80 can be disassembled from the mounting bracket 20. The operating plate 365 is moved away from the bottom plate 10 to elastically deform the mounting plate 361, and the latching block 3611 is disengaged from the mounting hole 112. The mounting bracket 20 is moved away from the body 11 and along a direction substantially parallel to the body 11. The mounting bracket 20 can be easy disassembled from the bottom plate 10.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and the arrangement of parts within the principles of the disclosure, to the full extent indicated by the broad general meaning of the terms in which the appended claims are expressed.

What is claimed is:

1. A mounting apparatus for an expansion card comprising:
   a bottom plate defining a mounting hole;
   a circuit board secured to the bottom plate by two locking members, and a gap defined between the bottom plate and the circuit board; and
   a mounting bracket comprising a base secured to the bottom plate, and the base comprising two positioning pieces and an elastically deformable mounting portion;
   wherein each of the two positioning pieces defines a cutout, and the two locking members are located between the two positioning pieces and abut edges of the cutout; the two positioning pieces are received in the gap to prevent the mounting bracket from moving along a first direction, the first direction is substantially perpendicular to the bottom plate, the elastically deformable mounting portion is engaged in the mounting hole to prevent the mounting bracket from moving along a second direction, and the second direction is substantially parallel to the bottom plate.

2. The mounting apparatus of claim 1, wherein the elastically deformable mounting portion comprises a latching block, the latching block is engaged in the mounting hole, and the two positioning pieces are substantially perpendicular to an extending direction of the latching block.

3. The mounting apparatus of claim 2, wherein the base comprises a bottom wall and a sidewall extends from the bottom wall, the two positioning pieces extends from the bottom wall, and the sidewall abuts against the circuit board.

4. The mounting apparatus of claim 1, wherein the bottom plate comprises a body, the circuit board is secured to the body, and a limiting portion extends from the body; the limiting portion comprises a first limiting piece and a second limiting piece, the first limiting piece is substantially perpendicular to the body, and the second limiting piece is substantially parallel to the body; and one of the two positioning pieces is received between the limiting portion and the body.

5. The mounting apparatus of claim 3, wherein the elastically deformable mounting portion comprises a mounting plate, a connecting plate and an operating plate; the mounting plate extends from the bottom wall, and the mounting plate is connected to the connecting plate and the operating plate; and a second gap is defined between the elastically deformable mounting portion and the bottom wall.

6. The mounting apparatus of claim 5, wherein the latching block extends from the mounting plate.

7. The mounting apparatus of claim 5, wherein the operating plate obliquely extends from the connecting plate, and the operating plate is operable to elastically deform the elastically deformable mounting portion.

8. The mounting apparatus of claim 1, wherein the mounting bracket further comprises an inserting portion integrated with the base, the inserting portion comprises two inserting plates and a resilient piece connected to the two inserting plates, and an inserting slot is defined between the two inserting plates; and the inserting slot is adapted to receive a first end of the expansion card, the resilient piece is adapted to abut a second end of the expansion card, and the second end is adjacent to the first end.

9. The mounting apparatus of claim 8, wherein two limiting blocks extend from the resilient piece, and the two limiting blocks are adapted for the expansion card sliding through and received in the inserting slot.

10. A mounting apparatus for an expansion card comprising:
    a bottom plate defining a mounting hole;
    a circuit board secured to the bottom plate, and a gap defined between the bottom plate and the circuit board; and
    a mounting bracket comprising a base secured to the bottom plate, and an inserting portion integrated with the base, and the base comprising two positioning pieces and an elastically deformable mounting portion;
    wherein the two positioning pieces are received in the gap, and the elastically deformable mounting portion is engaged in the mounting hole; the inserting portion comprises two inserting plates and a resilient piece connected to the two inserting plates, and an inserting slot is defined between the two inserting plates; the inserting slot is adapted to receive a first end of the expansion card, the resilient piece is adapted to abut a second end of the expansion card, and the second end is adjacent to the first end;
    wherein the bottom plate comprises a body, the circuit board is secured to the body, and a limiting portion extends from the body; the limiting portion comprises a first limiting piece and a second limiting piece, the first limiting piece is substantially perpendicular to the body, and the second limiting piece is substantially parallel to the body; and one of the two positioning pieces is received between the limiting portion and the body.

11. The mounting apparatus of claim 10, wherein the elastically deformable mounting portion comprises a latching block, and the latching block is engaged in the mounting hole.

12. The mounting apparatus of claim 11, wherein the two positioning pieces are substantially perpendicular to an extending direction of the latching block.

13. The mounting apparatus of claim 10, wherein the circuit board is secured to the bottom plate by two locking members, each of the two positioning pieces defines a cutout, and the two locking members are located between the two positioning pieces and abut edges of the cutout.

14. The mounting apparatus of claim 11, wherein the base comprises a bottom wall and a sidewall extends from the bottom wall, the two positioning pieces extends from the bottom wall, and the sidewall abuts against the circuit board.

15. The mounting apparatus of claim 14, wherein the elastically deformable mounting portion comprises a mounting plate, a connecting plate and an operating plate, the mounting plate extends from the bottom wall, and the mounting plate is connected to the connecting plate and the operating plate; and a second gap is defined between the elastically deformable mounting portion and the bottom wall.

16. The mounting apparatus of claim 15, wherein the latching block extends from the mounting plate.

17. The mounting apparatus of claim 15, wherein the operating plate obliquely extends from the connecting plate, and the operating plate is operable to elastically deform the elastically deformable mounting portion.

18. The mounting apparatus of claim 10, wherein two limiting blocks extend from the resilient piece, and the two limiting blocks are adapted for the expansion card sliding through and received in the inserting slot.

19. A mounting apparatus for an expansion card comprising:
 a bottom plate defining a mounting hole;
 a circuit board secured to the bottom plate by two locking members, and a gap defined between the bottom plate and the circuit board; and
 a mounting bracket comprising a base secured to the bottom plate, and an inserting portion integrated with the base, and the base comprising two positioning pieces and an elastically deformable mounting portion;
 wherein each of the two positioning pieces defines a cutout, and the two locking members are located between the two positioning pieces and abut edges of the cutout; the two positioning pieces are received in the gap, and the elastically deformable mounting portion is engaged in the mounting hole; the inserting portion comprises two inserting plates and a resilient piece connected to the two inserting plates, and an inserting slot is defined between the two inserting plates; the inserting slot is adapted to receive a first end of the expansion card, the resilient piece is adapted to abut a second end of the expansion card, and the second end is adjacent to the first end.

\* \* \* \* \*